No. 701,635. Patented June 3, 1902.
J. SMITH.
CANDY CUTTING MACHINE.
(Application filed Feb. 18, 1902.)
(No Model.)
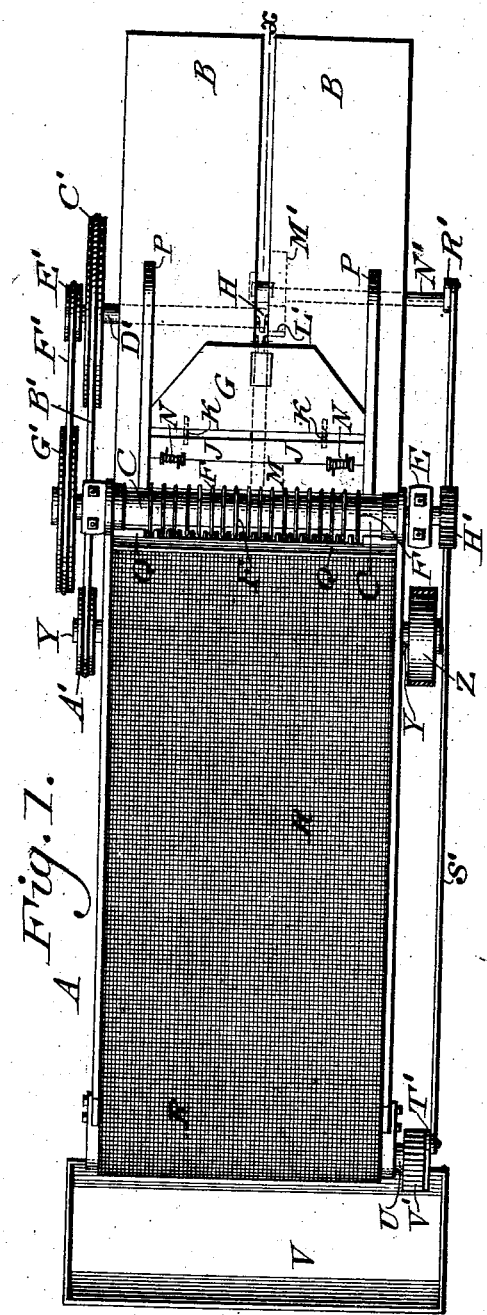
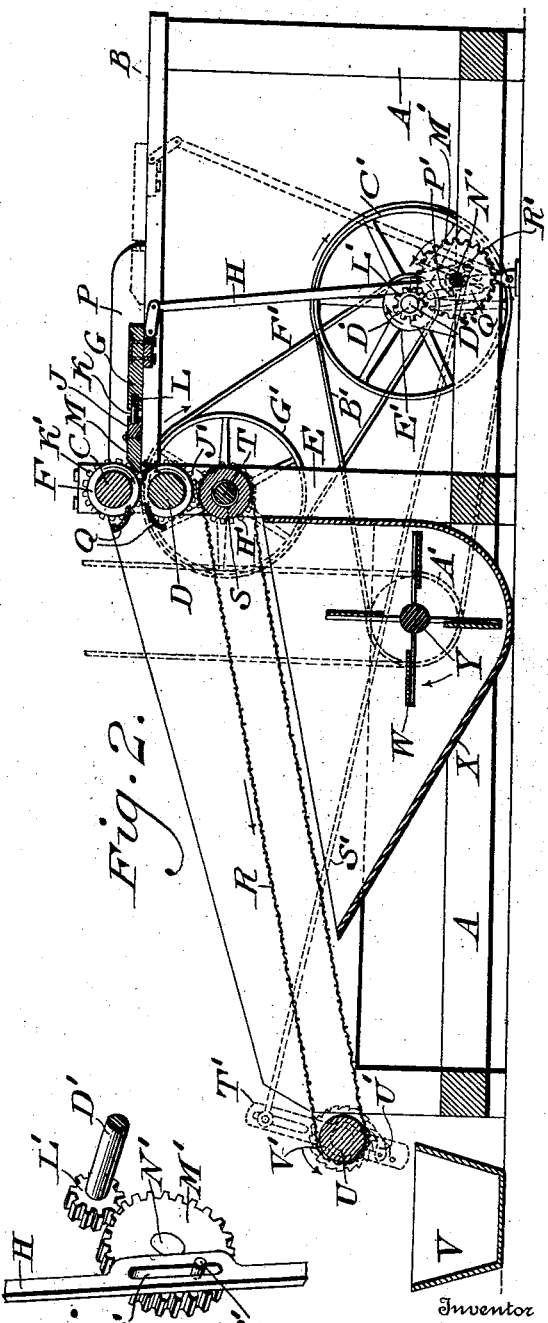
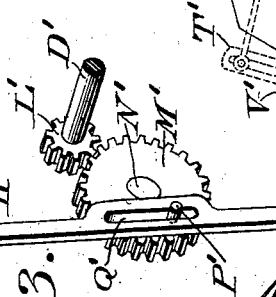
Witnesses
Inventor
John Smith

UNITED STATES PATENT OFFICE.

JOHN SMITH, OF PHILADELPHIA, PENNSYLVANIA, ASSIGNOR OF ONE-HALF TO HENRY BRANDLE, OF PHILADELPHIA, PENNSYLVANIA.

CANDY-CUTTING MACHINE.

SPECIFICATION forming part of Letters Patent No. 701,635, dated June 3, 1902.

Application filed February 18, 1902. Serial No. 94,613. (No model.)

*To all whom it may concern:*

Be it known that I, JOHN SMITH, a citizen of the United States, residing in the city and county of Philadelphia, State of Pennsylvania, have invented new and useful Improvements in Candy-Cutting Machines, of which the following is a specification.

My invention consists of an improved candy-cutting machine, as will be hereinafter described and claimed.

Figure 1 represents a top plan of a candy-cutting machine constructed in accordance with my invention. Fig. 2 represents a vertical section thereof, taken on the line $x\ x$ of Fig. 1. Fig. 3 represents a perspective view of a portion of the gearing of said machine.

Similar letters of reference indicate corresponding parts in the figures.

Referring to the drawings, A designates the framework supporting the operative parts of the machine and having a divided feeding-table B, upon which the candy is placed for the purpose of being fed to the cutting-rollers C and D, the latter being mounted in suitable bearings in the uprights E of the frame. The said cutting-rollers are provided with annular knives F, situated opposite each other.

The sticks of candy are fed to the knives by means of a feeder G, that is moved back and forth upon the table by means of a lever H, that is connected therewith and is actuated by mechanism hereinafter described, said lever being connected with the feeder G through the slot between the divisions of the table. The front end of the feeder G consists of a section J, between which and the rear portion of the feeder are inserted cushioning devices, which in the instance illustrated consist of dowel-pins K upon the section J, entering openings in the front end of the main portion of the feeder G, bearing against the springs L therein. The front end portion of the section J is hinged to the rear portion of said section, springs N being applied to said hinges to hold the front end portion M upon the table. The advantage of using a cushioned front section J is that it permits the stick of candy to be pressed with sufficient force against the knives to be fed thereto, while the hinged front portion allows the end of the feeder to be raised for the purpose of cleaning the under side thereof, as it is found that small pieces of candy find their way beneath the feeder and interfere with the operation thereof. Mounted upon the table are the longitudinal guides P, between which the feeder G slides.

At the delivery side of the cutting-rollers C and D are the stripping-fingers Q, the ends of which are situated between the knives F and serve to strip the candy therefrom. After leaving the roller the cut or creased candy falls upon the traveling conveyer R, that inclines downwardly from the rollers. The upper end of the conveyer passes around a sleeve S, mounted loosely upon the shaft T, the latter being mounted in bearings in the uprights E. The said conveyer R conveniently consists of wire-cloth, and at its lower end passes around the roller U to deliver the candy to a suitable receptacle V. Situated below the traveling conveyer is a fan W or other device for creating a current of air upwardly and through the conveyer to dry the candy resting thereon, said fan being inclosed in a casing X, whereby the current is directed over the greater portion of said conveyer. The said fan is mounted upon a shaft Y, to which is attached the pulley Z, by means of which power is applied to the machine. At the other end of the shaft Y is a pulley A', geared by means of a belt B' and pulley C' to the shaft D', the latter having a pulley E', geared by the belt F' and pulley G' with the shaft T, the other end of the shaft T having a gear-wheel H', intermeshing with the gear J' on the lower roller D, said gear J' intermeshing with the gear K' on the roller C. To the other end of the shaft D' is a gear-pinion L', that intermeshes with the gear M' of shaft N'. The gear M' is provided with a crank-pin P', that is situated within a slot Q' of the lever H, by means of which the lever is vibrated. The other end of the shaft N' is provided with a crank-arm R', that is connected, by means of a rod S', with the ratchet-bar T', mounted upon the end of the roller U, the ratchet U' on said bar T' engaging the ratchet-wheel V' rigid with the roller.

When power is applied to the shaft Y, a draft is created through the traveling conveyer R, while the cutting-rollers are rotated in the direction shown by the arrows, and the feeder G is moved back and forth. When a stick of candy is placed upon the table in front of the feeder, it is pressed forward to the rollers between which it passes and is either cut or deeply crimped, and then drops to the traveling conveyer R. The traveling conveyer moves by impulses to deliver the candy to the receptacle V, and while it is being carried along it is subjected to the air-current to dry the same, and it is to be noted that if the stick of candy is not severed into sections its agitation upon the conveyer R or the shock when it falls into the receptacle V is found sufficient to break it up into the desired sections.

Having thus described my invention, what I claim as new, and desire to secure by Letters Patent, is—

1. In a candy-cutting machine, cutting-rollers, a feed-table provided with a movable feeder situated on one side of said rollers, a cushioned front section on said feeder, and a traveling conveyer situated on the other side of said rollers.

2. In a candy-cutting machine, cutting-rollers consisting of opposing annular knives, a feed-table provided with a movable feeder situated on one side of said rollers, a cushioned front section on said feeder, and a traveling conveyer situated on the other side of said rollers.

3. In a candy-cutting machine, cutting-rollers consisting of opposing annular knives, stripping-fingers situated between said knives, a feed-table provided with a movable feeder situated on one side of said rollers, a cushioned front section on said feeder, and a traveling conveyer situated on the other side of said rollers.

4. In a candy-cutting machine, cutting-rollers, a feed-table situated on one side thereof, a reciprocatory feeder mounted upon said table, and a cushioned front section on said feeder.

5. In a candy-cutting machine, cutting-rollers, a feed-table situated adjacent the same, and a sliding member mounted upon said table and connected with a vibratory lever extending through an opening in said table, said sliding member being provided with a cushioned front section.

6. In a candy-cutting machine, a feed-table having a reciprocatory feeder provided with a cushioned front section.

7. In a candy-cutting machine, a feed-table provided with a reciprocatory feeder having its front section movably connected therewith by means of dowels and springs.

8. In a candy-cutting machine, a feed-table having a reciprocatory feeder provided with a vertically-movable front section.

9. In a candy-cutting machine, a feed-table having a reciprocatory feeder provided with a vertically-movable front section, and means for holding said front section under tension upon the table.

10. In a candy-cutting machine, a feed-table having a reciprocatory feeder provided with a front section connected therewith by spring-hinges.

11. In a candy-cutting machine, cutting-rollers, a feed-table situated on one side thereof, a traveling conveyer on the other side thereof, and means for creating an air-current through said conveyer.

12. In a candy-cutting machine, cutting-rollers, a feed-table situated upon one side thereof, a traveling conveyer situated on the other side thereof, and consisting of open-work or reticulated material, and devices for causing an air-current situated below said conveyer.

13. In a candy-cutting machine, a conveyer consisting of articulated material, devices for causing an air-current to pass through said articulated material, and means for intermittently moving the said conveyer.

14. In a candy-cutting machine, cutting-rollers geared together, a feed-table situated on one side thereof and having a movable feeder, a lever connected with said feeder and extending through an opening in said table, a traveling conveyer situated on the other side of said rollers, devices for creating an air-current situated below said traveling conveyer and actuating said means for causing an air-current.

JOHN SMITH.

Witnesses:
FRED. E. SCHMIDT,
ALFRED P. KLEIN.